US009740955B2

(12) United States Patent
Shi et al.

(10) Patent No.: US 9,740,955 B2
(45) Date of Patent: *Aug. 22, 2017

(54) METHOD FOR PRODUCT RECOGNITION FROM MULTIPLE IMAGES

(71) Applicant: Ricoh Company, Ltd., Tokyo (JP)

(72) Inventors: Shu Shi, Menlo Park, CA (US); Michael J. Gormish, Redwood City, CA (US)

(73) Assignee: Ricoh Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/351,348

(22) Filed: Nov. 14, 2016

(65) Prior Publication Data
US 2017/0124416 A1 May 4, 2017

Related U.S. Application Data

(63) Continuation of application No. 14/316,627, filed on Jun. 26, 2014, now Pat. No. 9,495,606.
(Continued)

(51) Int. Cl.
| G06K 9/00 | (2006.01) |
| G06K 9/46 | (2006.01) |
| G06Q 10/08 | (2012.01) |
| G06T 3/40 | (2006.01) |
| G06K 9/62 | (2006.01) |
| G06K 9/20 | (2006.01) |

(Continued)

(52) U.S. Cl.
CPC ............ *G06K 9/46* (2013.01); *G06K 9/00536* (2013.01); *G06K 9/03* (2013.01); *G06K 9/20* (2013.01);
(Continued)

(58) Field of Classification Search
CPC .. G06K 9/00; G06K 9/00201; G06K 9/00208; G06K 9/00496; G06K 9/00536; G06K 9/00577; G06K 9/03; G06K 9/033; G06K 9/2054; G06K 9/3216; G06K 9/3233; G06K 9/34; G06K 9/342; G06K 9/6288; G06K 9/6289; G06K 9/6292; G06K 9/6293; G06K 2009/2045; G06K 2009/6213; G06T 3/0068; G06T 5/50; G06T 7/0022; G06T 7/0024; G06T 7/0026; G06T 7/0028;
(Continued)

(56) References Cited

U.S. PATENT DOCUMENTS

| 6,385,349 B1 | 5/2002 | Teo |
| 7,168,618 B2 | 1/2007 | Schwartz |

(Continued)

FOREIGN PATENT DOCUMENTS

| WO | WO2013128427 | 9/2013 |

OTHER PUBLICATIONS

European Search Report for Application No. 15156770.8, mailed on Jul. 3, 2015, 10 pages.

*Primary Examiner* — Eric Rush
(74) *Attorney, Agent, or Firm* — Patent Law Works LLP

(57) ABSTRACT

A method for product recognition from multiple images includes producing a plurality of recognition results for a plurality of input images, stitching the plurality of input images into a single stitched image; merging the plurality of recognition results using information from stitching the plurality of input images to generate a merged recognition result; and outputting the merged recognition result. The disclosure also includes systems for implementing the method.

20 Claims, 15 Drawing Sheets

Related U.S. Application Data

(60) Provisional application No. 61/946,225, filed on Feb. 28, 2014.

(51) Int. Cl.
*G06K 9/34* (2006.01)
*G06T 3/00* (2006.01)
*G06K 9/03* (2006.01)

(52) U.S. Cl.
CPC .......... *G06K 9/342* (2013.01); *G06K 9/6288* (2013.01); *G06K 9/6292* (2013.01); *G06Q 10/087* (2013.01); *G06T 3/0068* (2013.01); *G06T 3/4038* (2013.01); *G06K 2009/2045* (2013.01)

(58) Field of Classification Search
CPC ....... G06T 7/003; G06T 7/0038; G06T 7/004; G06T 7/0042; G06T 7/0044; G06T 7/0097; G06T 2200/32; G06T 2207/20212; G06T 2207/20221
USPC ....... 382/100, 141, 143, 181, 209, 215–218, 382/224, 276, 282–284, 294, 298
See application file for complete search history.

(56) References Cited

U.S. PATENT DOCUMENTS

| | | | |
|---|---|---|---|
| 7,818,679 | B2 | 10/2010 | Clarke |
| 7,949,568 | B2 | 5/2011 | Fano et al. |
| 8,620,036 | B2 | 12/2013 | Irmatov |
| 8,630,924 | B2 * | 1/2014 | Groenevelt .......... G06Q 10/087 340/5.92 |
| 9,292,739 | B1 * | 3/2016 | Gray ..................... G06K 9/033 |
| 2002/0138374 | A1 | 9/2002 | Jennings et al. |
| 2003/0103683 | A1 | 6/2003 | Horie |
| 2003/0198386 | A1 | 10/2003 | Luo |
| 2005/0196070 | A1 | 9/2005 | Takakura et al. |
| 2009/0092287 | A1 | 4/2009 | Moraleda et al. |
| 2009/0192921 | A1 * | 7/2009 | Hicks ................... G06F 3/0312 382/284 |
| 2010/0045423 | A1 | 2/2010 | Glickman et al. |
| 2010/0046840 | A1 | 2/2010 | Hashiguchi et al. |
| 2010/0171826 | A1 | 7/2010 | Hamilton et al. |
| 2011/0011936 | A1 | 1/2011 | Morandi |
| 2014/0003727 | A1 * | 1/2014 | Lortz ................ G06F 17/30247 382/218 |
| 2014/0093156 | A1 | 4/2014 | Gawne |
| 2014/0152763 | A1 | 6/2014 | Lim et al. |

\* cited by examiner

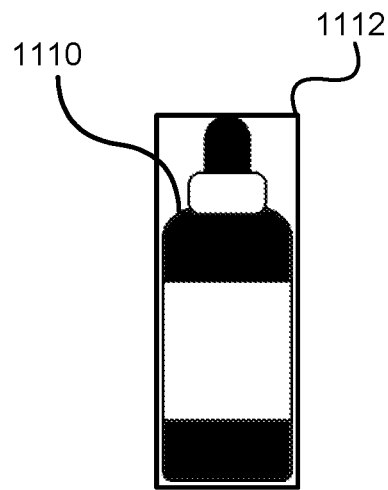
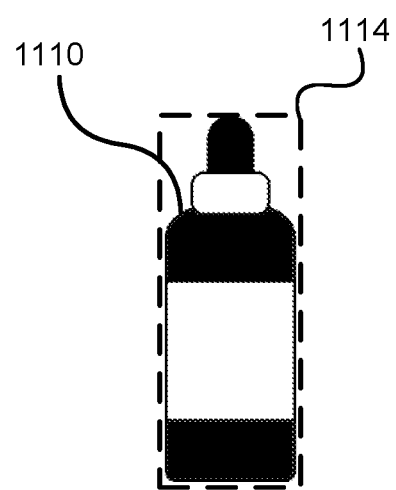
Figure 11A          Figure 11B
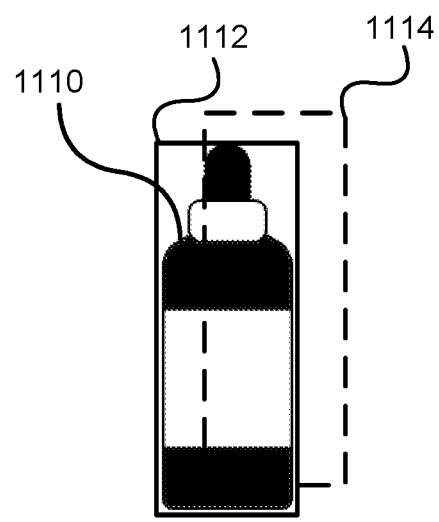
Figure 11C

METHOD FOR PRODUCT RECOGNITION FROM MULTIPLE IMAGES

CROSS-REFERENCE TO RELATED APPLICATIONS

The present is a continuation of and claims priority to U.S. application Ser. No. 14/316,627, filed Jun. 26, 2014, titled "Method for Product Recognition from Multiple Images," which claims priority, under 35 U.S.C. §119, of U.S. Provisional Patent Application Ser. No. 61/946,225, filed Feb. 28, 2014 and entitled "Method for Product Recognition From Multiple Images," each of which is incorporated by reference in its entirety.

BACKGROUND

1. Field of the Art

The present specification generally relates to the field of image processing. More specifically, the present specification relates to a system and method for object recognition from multiple images.

2. Description of the Related Art

In many instances it is valuable to use image recognition technology to recognize multiple objects captured over multiple images. For example, in a retail environment it is useful to know what the state of products is on the shelves or displays where particular products are to be stocked at particular locations, but because of consumer activity products can be out of stock or moved to incorrect locations. While a human can move products to their correct locations, it is time consuming to record the position of all products. Therefore it is useful to automatically or semi-automatically obtain information about the state of products on the shelves or displays. One method for obtaining information about the state of products on shelves or displays is to use image recognition technology. However, capturing images in a retail environment can be difficult because of narrow aisles and activity in the store. Therefore multiple images may need to be taken to capture all of the products of interest.

One method for obtaining information about the state of products on shelves or displays using image recognition technology is shown in FIG. 1. At 102, an image stitching module receives multiple input images. The images may be received in a graphic file format such as JPEG, TIFF, PNG, BMP, or the like. The stitching module may be a known stitching module, such as the detailed stitching example code which is part of the OpenCV machine vision software package. At 104, the stitching module stitches the multiple input images into a single stitched image. At 106, this single image is used as input to a recognition module. At 108, the system may output the products recognized from the single stitched image and the stitched image. The products may be output in a machine readable form. For example, the system may produce a JavaScript Object Notation (JSON) file, or an Extensible Markup Language (XML) file, containing a list of items and their location in the stitched image.

Unfortunately, stitching an image can lead to artifacts, and can interfere with optimal operation of the recognition module or produce incorrect recognition results. Thus operating the stitching module before recognition can lead to missed products and incorrectly identified products because of the low quality image input to the recognition module. Thus it is desirable to be able to capture multiple images of shelves and recognize as many products and the locations of those products as possible. It is important to recognize all of the products, but not to double count products that appear in multiple images.

SUMMARY

The techniques introduced herein overcome the deficiencies and limitations of the prior art, at least in part, with a multi-object recognition system configured to receive multiple images and identify multiple objects that have been indexed in a database.

The techniques include an image recognition system for producing a plurality of recognition results for a plurality of input images, the recognition results identifying objects in the plurality of input images. The image recognition system includes a joint stitching module for stitching the plurality of input images into a single stitched image and merging the plurality of recognition results using information from stitching the plurality of input images to generate a merged recognition result. The image recognition system then outputs the merged recognition result.

Other aspects include corresponding methods, systems, apparatuses, and computer program products for these and other innovative techniques.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the features and advantages described.

BRIEF DESCRIPTION OF THE DRAWINGS

The techniques described herein are illustrated by way of example, and not by way of limitation in the figures of the accompanying drawings in which like reference numerals are used to refer to similar elements.

FIGS. 11A-11C illustrate block diagrams depicting bounding boxes of recognized objects in input images.

The figures depict various embodiments of the techniques described herein for purposes of illustration only. It should be readily recognized from the following discussion that alternative embodiments of the structures and methods illustrated herein may be employed without departing from the principles of the techniques described herein.

DETAILED DESCRIPTION

Figure 1:
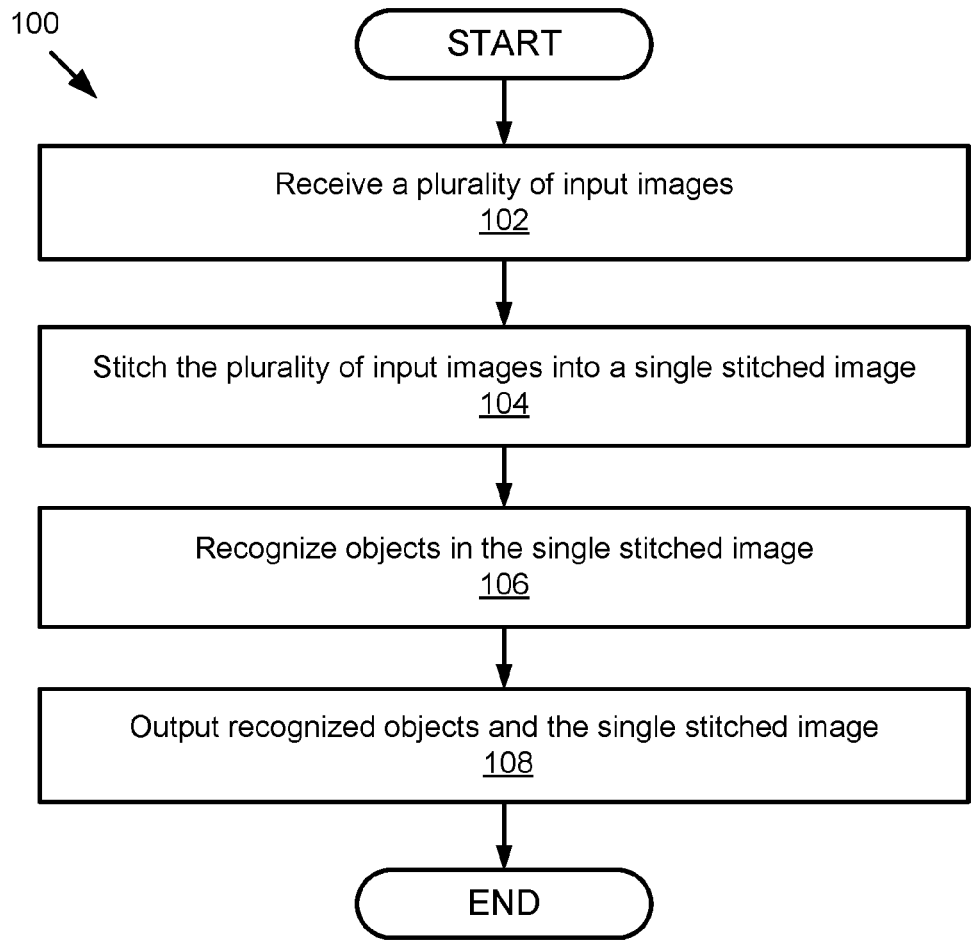
FIG. 1 is a flow diagram of a prior art approach for performing stitching first and processing product recognition second.
Figure 2:
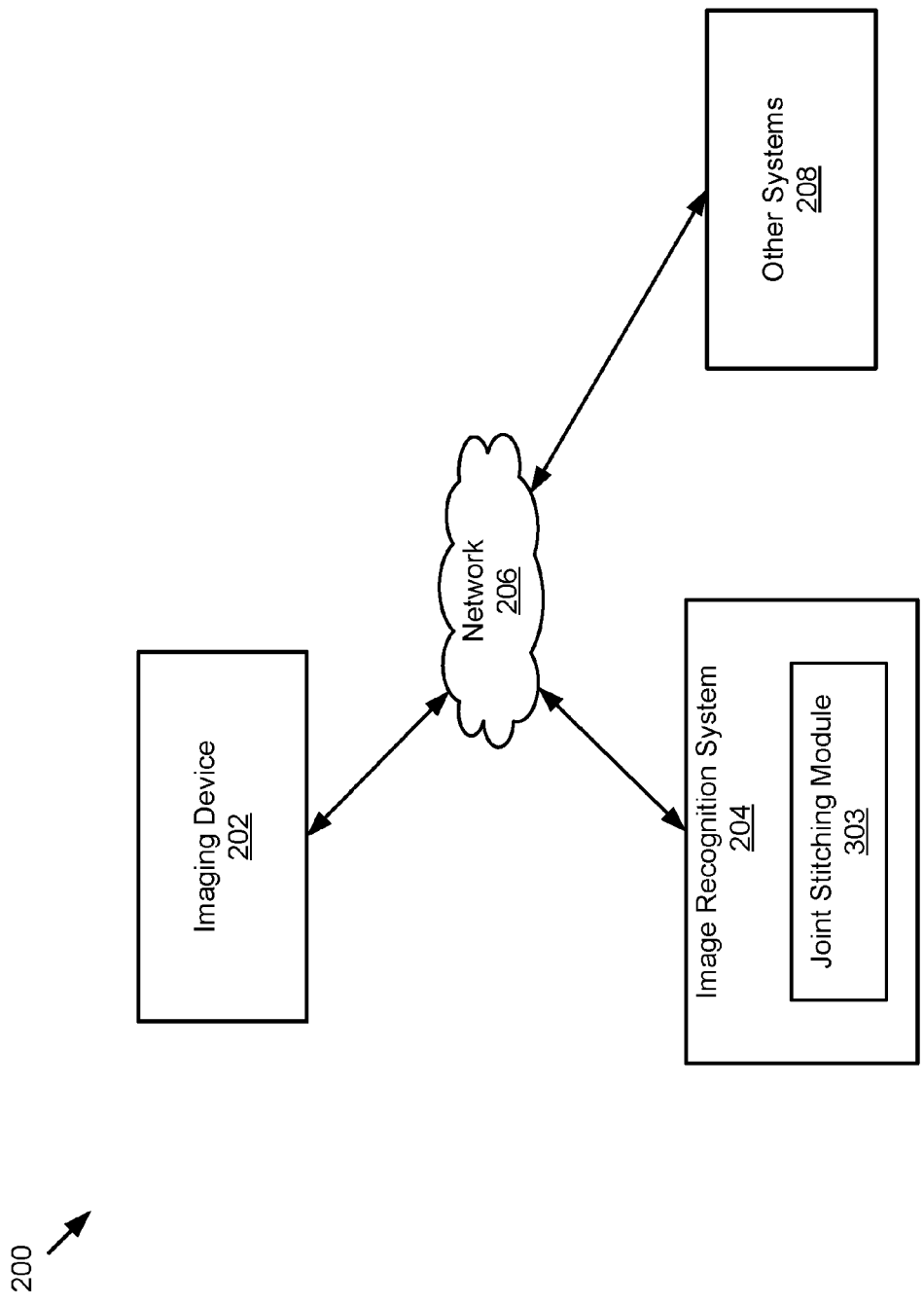
FIG. 2 illustrates a block diagram of a system for recognizing products from multiple images.

A system and method for recognizing products from multiple images is described. FIG. 2 illustrates a block diagram of a system 200 for recognizing products from multiple images, according to one embodiment. The illustrated system 200 may include an imaging device 202, an image recognition system 204, including a joint stitching module 303, and other systems 208. In the illustrated embodiment, the entities of the system 200 are communicatively coupled via a network 206. In other embodiments, network 206 may be optional and the entities of system 200 may communicate directly.

The network 206 can be a conventional type, wired or wireless, and may have numerous different configurations including a star configuration, token ring configuration or other configurations. Furthermore, the network 206 may include a local area network (LAN), a wide area network (WAN) (e.g., the Internet), and/or other interconnected data paths across which multiple devices may communicate. In some embodiments, the network 206 may be a peer-to-peer network. The network 206 may also be coupled to or include portions of a telecommunications network for sending data using a variety of different communication protocols. In some embodiments, the network 206 may include Bluetooth communication networks or a cellular communications network for sending and receiving data including via short messaging service (SMS), multimedia messaging service (MMS), hypertext transfer protocol (HTTP), direct data connection, WAP, email, etc. Although FIG. 2 illustrates one network 206 coupled to the imaging device 202, image recognition system 204, and other systems 208, in practice one or more networks 206 can be connected to these entities.

The imaging device 202 is coupled with the image recognition system 204 via network 206. Although only one imaging device 202 is illustrated, it will be recognized that any number of imaging devices 202 may be included in the system 200. In various embodiments, the imaging device 202 is adapted to capture a plurality of images of shelves or displays in a retail, warehouse, or storage environment. The imaging device 202 may be, for example, a digital camera, a smartphone or cellular phone camera, a webcam, a video recorder, etc. In one embodiment, the imaging device 202 may be mounted to a moving base that may autonomously, or semi-autonomously, move around the shelves or displays and capture the plurality of images.

In various embodiments, the image recognition system 204 may be a computing device including a processor, a memory, applications, a database, and network communication capabilities. Although only a single image recognition system 204 is shown in the example of FIG. 2, it should be understood that there may be any number of image recognition systems 204 with one or more operations performed by the image recognition system distributed among multiple image recognition systems. The image recognition system 204 in the example of FIG. 2 includes a joint stitching module 303 configured to stitch a plurality of images into a single stitched image and merge recognized objects in the plurality of images into a merged recognition result. The joint stitching process is described in more detail below with reference to FIGS. 4-10D.

In one embodiment, the image recognition system 204 may be operable with the other systems 208, which may be coupled to the network 206. The other systems 208 in FIG. 2 may represent other existing systems. For example, the other systems 208 may include product inventory systems, retail stocking systems, product placement systems, or the like. The image recognition system 204 is capable of interfacing and interacting with other systems 208. The image recognition system 204 may, for example, provide a stitched image and merged recognition results to the other systems 208 for use in stock analysis, product placement analysis, inventory control, etc.

Figure 3:
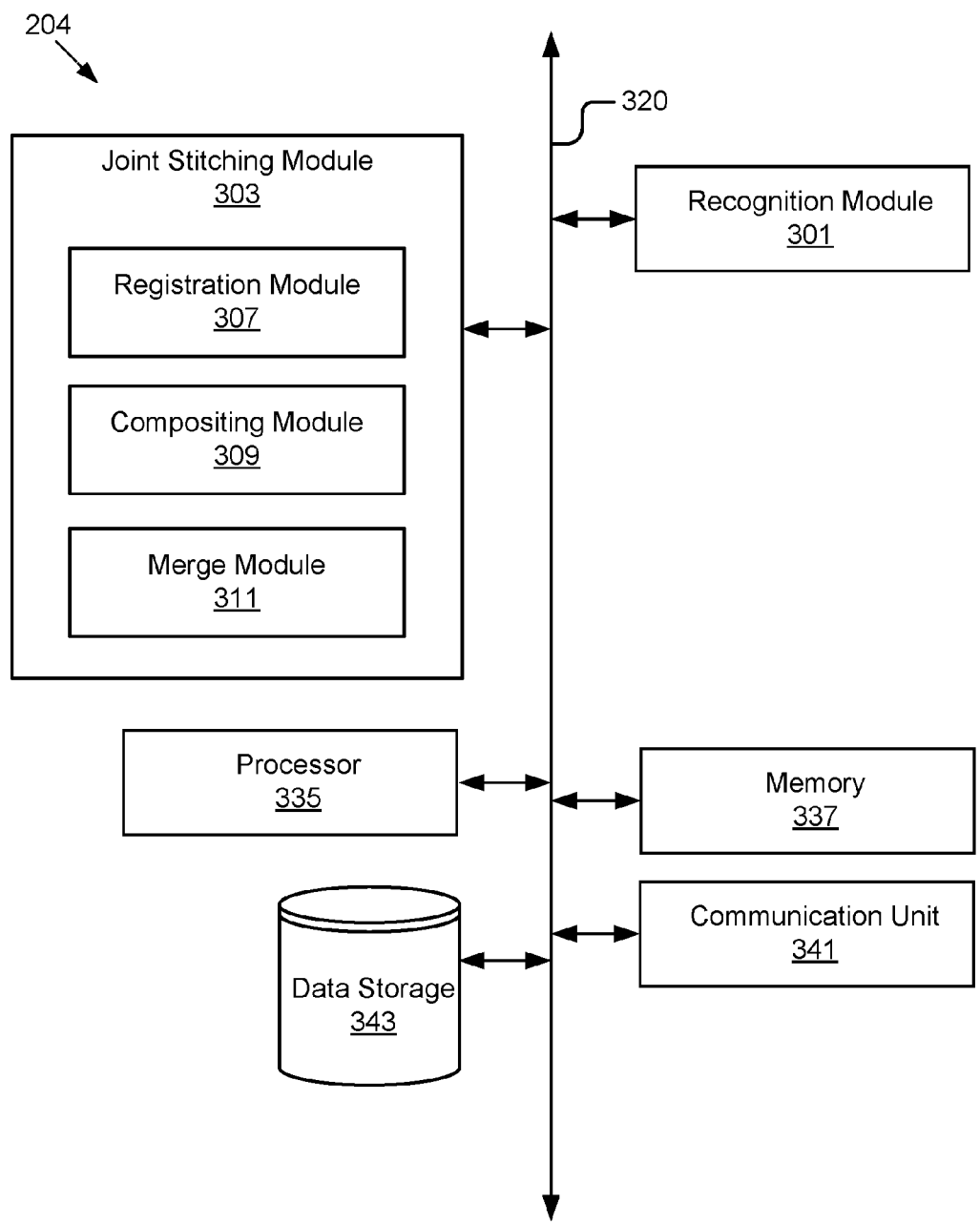
FIG. 3 illustrates a block diagram of an image recognition system.

Referring now to FIG. 3, an example of an image recognition system 204 is shown in more detail. In the example of FIG. 3, the image recognition system 204 may include a recognition module 301, a joint stitching module 303, a processor 335, a memory 337, a communication unit 341, and data storage 343. The components of the image recognition system 204 are communicatively coupled by a bus 320. The bus 320 may represent one or more buses including an industry standard architecture (ISA) bus, a peripheral component interconnect (PCI) bus, a universal serial bus (USB), or some other bus known in the art to provide similar functionality.

The processor 335 may execute software instructions by performing various input/output, logical, and/or mathematical operations. The processor 335 may have various computing architectures to process data signals including, for example, a complex instruction set computer (CISC) architecture, a reduced instruction set computer (RISC) architecture, a Graphics Processing Unit (GPU), and/or an architecture implementing a combination of instruction sets. The processor 335 may be physical and/or virtual, and may include a single processing unit or a plurality of processing units and/or cores. In some implementations, the processor 335 may be capable of generating and providing electronic display signals to a display device, supporting the display of images, capturing and transmitting images, performing complex tasks including various types of feature extraction and sampling, etc. In some implementations, the processor 335 may be coupled to the memory 337 via the bus 320 to access data and instructions therefrom and store data therein. The bus 320 may couple the processor 335 to the other components of the image recognition system 204 including, for example, the recognition module 301, the joint stitching module 303, the memory 337, the communication unit 341, and the data storage 343. It will be apparent that other processors, operating systems, sensors, displays and physical configurations are possible.

The memory 337 may store and provide access to data for the other components of the image recognition system 204. The memory 337 may be included in a single computing device or a plurality of computing devices as discussed elsewhere herein. In some implementations, the memory 337 may store instructions and/or data that may be executed by the processor 335. For example, in one embodiment, the memory 237 may store instructions, which when executed by the processor, cause the processor to implement the recognition module 301 and/or the joint stitching module 303. The memory 337 may also be capable of storing other instructions and data, including, for example, an operating system, hardware drivers, other software applications, databases, etc. The memory 337 may be coupled to the bus 320 for communication with the processor 335 and the other components of image recognition system 204.

The memory 337 may include one or more non-transitory computer-usable (e.g., readable, writeable, etc.) mediums, which can be any tangible apparatus or device that can contain, store, communicate, propagate or transport instructions, data, computer programs, software, code, routines, etc., for processing by or in connection with the processor 335. In some implementations, the memory 337 may include one or more of volatile memory and non-volatile memory. For example, the memory 337 may include, but is not limited to, one or more of a dynamic random access memory (DRAM) device, a static random access memory (SRAM) device, an embedded memory device, a discrete memory device (e.g., a PROM, FPROM, ROM), a hard disk drive, an optical disk drive (CD, DVD, Blue-Ray™, etc.). It should be understood that the memory 337 may be a single device or may include multiple types of devices and configurations.

The communication unit 341 is hardware for receiving and transmitting data by coupling the processor 335 to the network 206 and other processing systems. The communication unit 341 is configured, for example, to receive the plurality of images from the imaging device 202 and/or transmit image recognition results and the stitched image. In one embodiment, the communication unit 341 may include a port for direct physical connection to the network 206 or to another communication channel. For example, the communication unit 341 may include an RJ45 port or similar port for wired communication with the network 206. In another embodiment, the communication unit 341 may include a wireless transceiver (not shown) for exchanging data via the network 206 or any other communication channel using one or more wireless communication methods, such as IEEE 802.11, IEEE 802.16, Bluetooth® or another suitable wireless communication method.

In yet another embodiment, the communication unit 341 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 341 may include a wired port and a wireless transceiver. The communication unit 341 also provides other conventional connections to the network 206 for distribution of files and/or media objects using standard network protocols such as TCP/IP, HTTP, HTTPS and SMTP as will be understood to those skilled in the art.

The data storage 343 is a non-transitory memory that stores data for providing the functionality described herein. The data storage 343 may be a dynamic random access memory (DRAM) device, a static random access memory (SRAM) device, flash memory or some other memory devices. In some embodiments, the data storage 343 also may include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment, the data storage 343 is communicatively coupled to the bus 320. In one embodiment, the data storage 343 stores the plurality of images and data associated with the plurality of images. For example, data storage 343 may image recognition results including object bounding boxes, image patches, and/or recognized objects. The data storage 343 may also be configured to store stitched images and data associated with the stitched image, for example, input images, registration data, seam masks, resized images, warped images, and the like. The data stored in data storage 343 is described in more detail below. In one embodiment, the data storage 343 may store other data for providing the functionality described herein.

The recognition module 301 may include software and/or logic to recognize objects in an image. The recognition module 301 may perform image recognition according to existing public and/or proprietary image recognition algorithms. In some embodiments, the recognition module 301 can be implemented using hardware including a field-programmable gate array (FPGA) or an application-specific integrated circuit (ASIC). In some embodiments, the recognition module 301 can be implemented using a combination of hardware and software executable by processor 335. In some embodiments, the recognition module 301 is a set of instructions executable by the processor 335. In some implementations, the recognition module 301 is stored in the memory 337 and is accessible and executable by the processor 335. In some implementations, the recognition module 301 is adapted for cooperation and communication with the processor 335, the memory 337 and other components of the image recognition system 204 via the bus 320.

Although the image recognition module 204 depicted in the example of FIG. 3 includes a single recognition module 301, one of ordinary skill in the art will recognize that one or more additional recognition modules may be used for image recognition. Likewise, as described elsewhere herein, individual images can be recognized serially or in parallel. In various embodiments, the recognition module 301 outputs recognition results including an object ID and coordinates of the object in the original images. The recognition results may be used to provide a merged recognition result for a stitched image as described in more detail below. In some embodiments, the recognition module 301 may begin performing recognition on input images received from the imaging device 202 while the imaging device 202 is still capturing images to be used in creating the final stitched image.

The joint stitching module 303 may include software and/or logic to create a single stitched image from a plurality of input images and a merged recognition result from the plurality of recognition results corresponding to the plurality of input images. The joint stitching module may include a registration module 307, a compositing module 309, and a merge module 311. While the registration module 307, the compositing module 309, and the merge module 311 are shown included in the joint stitching module, it will be recognized that the modules may be implemented as separate modules that may cooperate to perform the functions of the joint stitching module 303 as described herein. In some embodiments, the joint stitching module 303 can be implemented using hardware including a field-programmable gate array (FPGA) or an application-specific integrated circuit (ASIC). In some embodiments, the joint stitching module 303 can be implemented using a combination of hardware and software executable by processor 335. In some embodiments, the joint stitching module 303 is a set of instructions executable by the processor 335. In some implementations, the joint stitching module 303 is stored in the memory 337 and is accessible and executable by the processor 335. In some implementations, the joint stitching module 303 is adapted for cooperation and communication with the processor 335, the memory 337 and other components of the image recognition system 204 via the bus 320. The function of the joint stitching module 303, the registration module 307, the compositing module 309, and the merge module 311 are described in more detail below with reference to FIGS. 6-10D.

Figure 4:
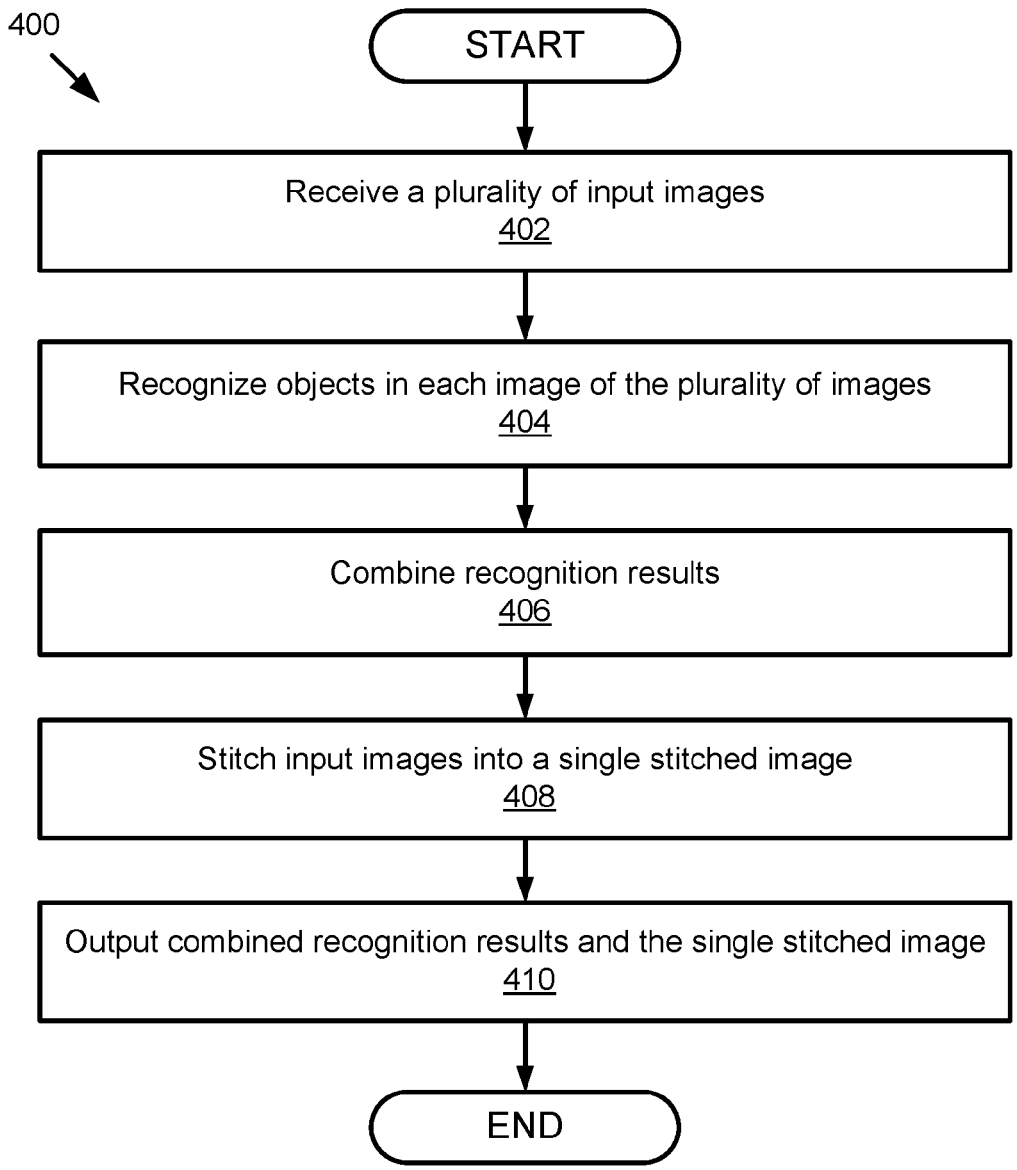
FIG. 4 is a flow diagram of one embodiment of a method for independently combining object recognition results and image stitching.

Performing image recognition on each image of the plurality of input images prior to stitching may increase object recognition results. One possible implementation is described in the example of FIG. 4. FIG. 4 is a flow diagram of one embodiment of a method 400 for independently combining object recognition results and image stitching. At 402, the image recognition module 204 may receive a plurality of input images. At 404, the image recognition module 204 may recognize objects from the plurality of input images. In some embodiments, the image recognition module 204 may recognize multiple objects in a single image. In some embodiments, the image recognition module 204 may process the plurality of input images serially or in parallel and output corresponding recognition results for each image of the plurality of input images.

At 406, the image recognition module 204 may combine the recognition results for the plurality of input images to form a single list of recognized objects (e.g., the products on a store shelf). This combination could be a simple concatenation of the recognized objects. However, simple concatenation of recognized objects can lead to counting a single real-world object, which appears in more than one image, more than once. Consequently, the output of recognized objects will not reflect an accurate count of real-world objects captured in the plurality of input images.

At 408, a joint stitching module 303 may stitch the plurality of input images into a single stitched image according to known methods (e.g., the OpenCV image stitching method). The image stitching may take place in serial or parallel with image recognition and at 410, the system 200 outputs a combined recognition result and a single stitched image.

Figure 5:
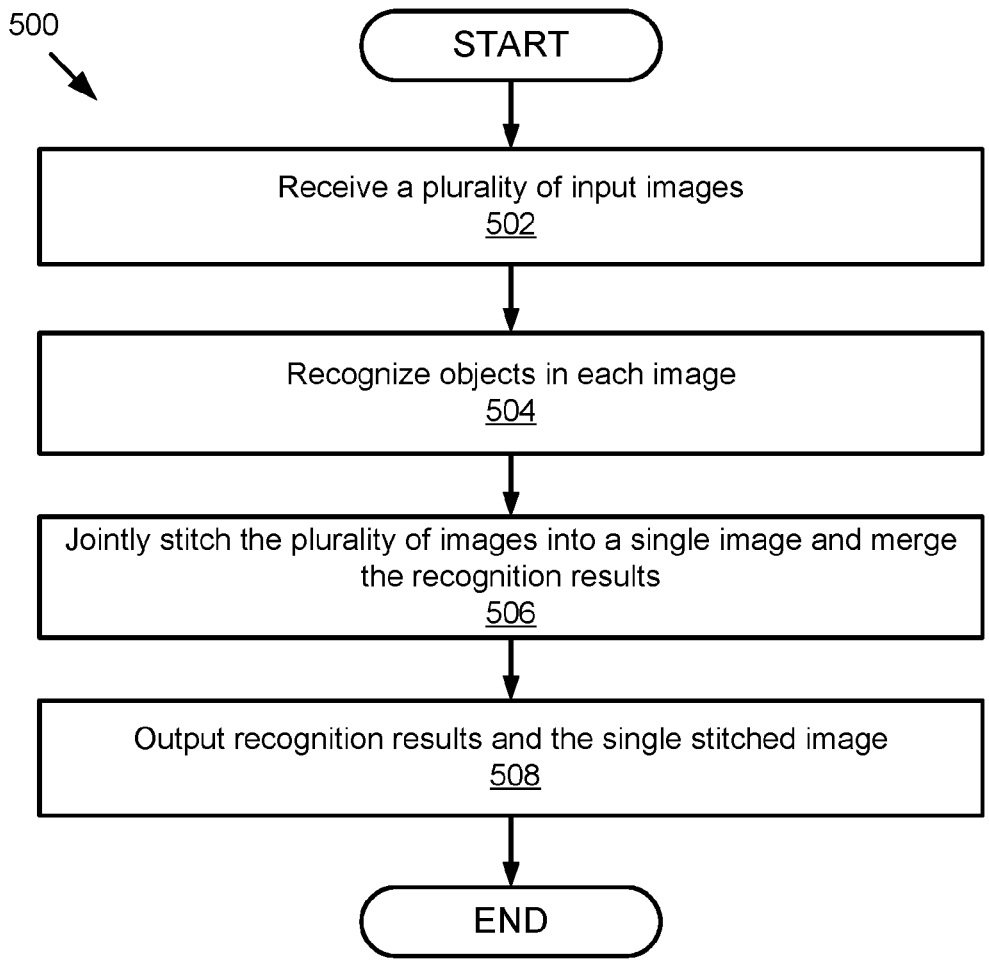
FIG. 5 is a flow diagram of one embodiment of a method for jointly merging object recognition results and image stitching.

While the method 400 described in the example of FIG. 4 may reduce the artifacts introduced during stitching and increase the accuracy of object recognition in each of the individual input images, as described above, the combined recognition results may not be accurate. To increase the accuracy of the combined recognition results, information from the image stitching process may be used to merge the recognition results into merged recognition results. FIG. 5 is a flow diagram of one embodiment of a method 500 for jointly merging object recognition results and image stitching. At 502, the image recognition module 204 may receive a plurality of input images and at 504, the recognition module 301 may recognize objects in each image of the plurality of input images. Each recognition result may include a list of descriptions of the recognized objects from an input image. This list of descriptions may be output in a variety of formats including, for example, JavaScript Object Notation (JSON), Extensible Markup Language (XML), or the like. The description for each recognized object may include, for example, an object label, an object ID (e.g., a stock keeping unit (SKU)), and coordinates of a bounding box indicating where the object is located in the input image. The description for each recognized object may also include other information including a confidence of the recognition module 301 in identifying the object. At 506, the joint stitching module 303 jointly stitches the plurality of images into a single image and merges the recognition results. This process is described in more detail below with reference to FIGS. 6-10. At 508, the image recognition system 204 outputs the merged recognition results and a single stitched image.

Figure 6:
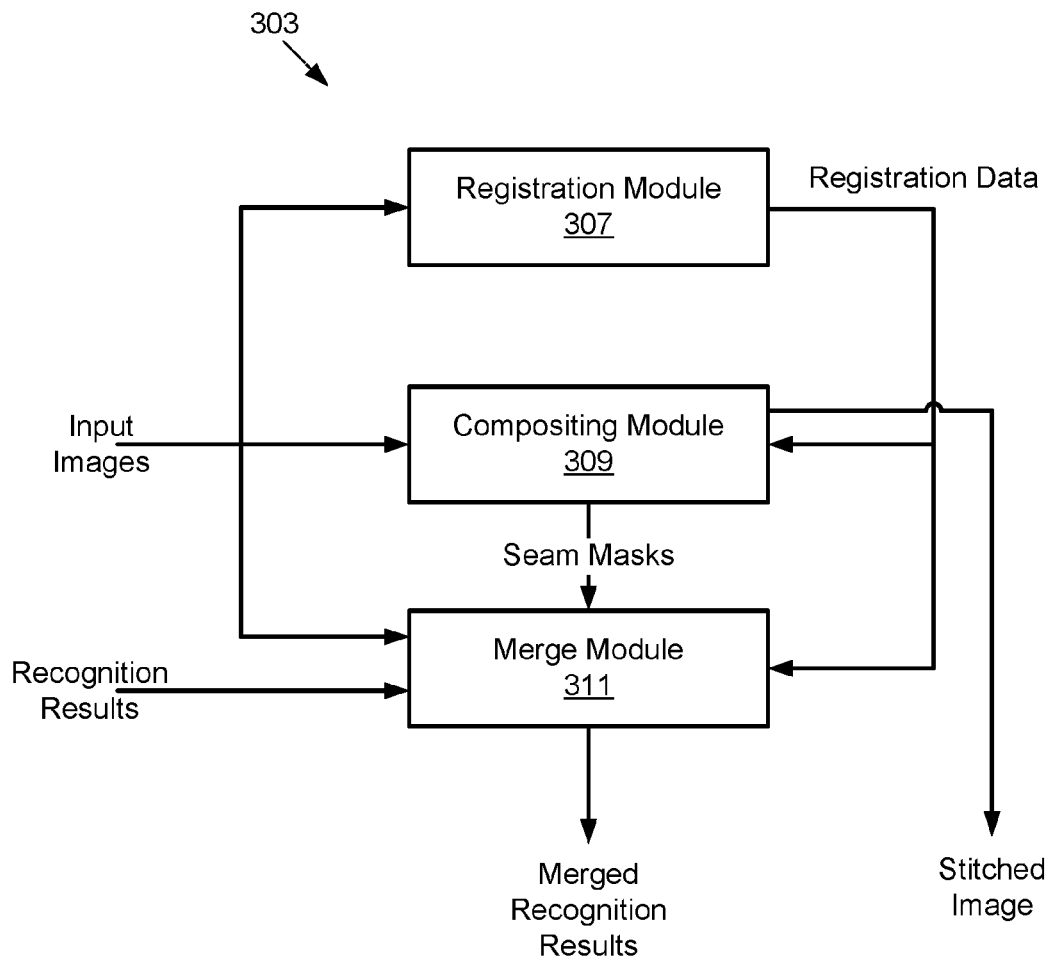
FIG. 6 is an example system flow diagram depicting a method for jointly merging object recognition results and image stitching.

FIG. 6 is an example system flow diagram depicting joint stitching module 303 performing a method for jointly merging object recognition results and image stitching. In the example of FIG. 6, the registration module 307 receives the plurality of input images as its input and produces registration data as an output. One example method for generating the registration data is described below with reference to FIG. 7. The compositing module 309 receives as its inputs the plurality of input images and the registration data from the registration module 307. The output of the compositing module 309 includes the single stitched image and seam masks used in generating the single stitched image. One example method for generating the single stitched image and seam masks by the compositing module 309 is described below with reference to FIG. 8. The merge module 311 receives as its inputs the input images, the recognition results from the recognition module 301, the seam masks from the compositing module 309, and the registration data from the registration module 307. The merge module 311 uses these inputs to generate merged recognition results as described below with reference to FIG. 9. In some embodiments (not shown), the joint stitching module 303 may use the merged recognition results to refine the final stitched image. For example, after generating the merged recognition results, the merge module 311 may provide the merged recognition results to the compositing module 309 and the compositing module 309 may use the location of the recognition results to adjust the seams of the image to reduce artifacts or other distortion in the vicinity of recognized objects.

Figure 7:
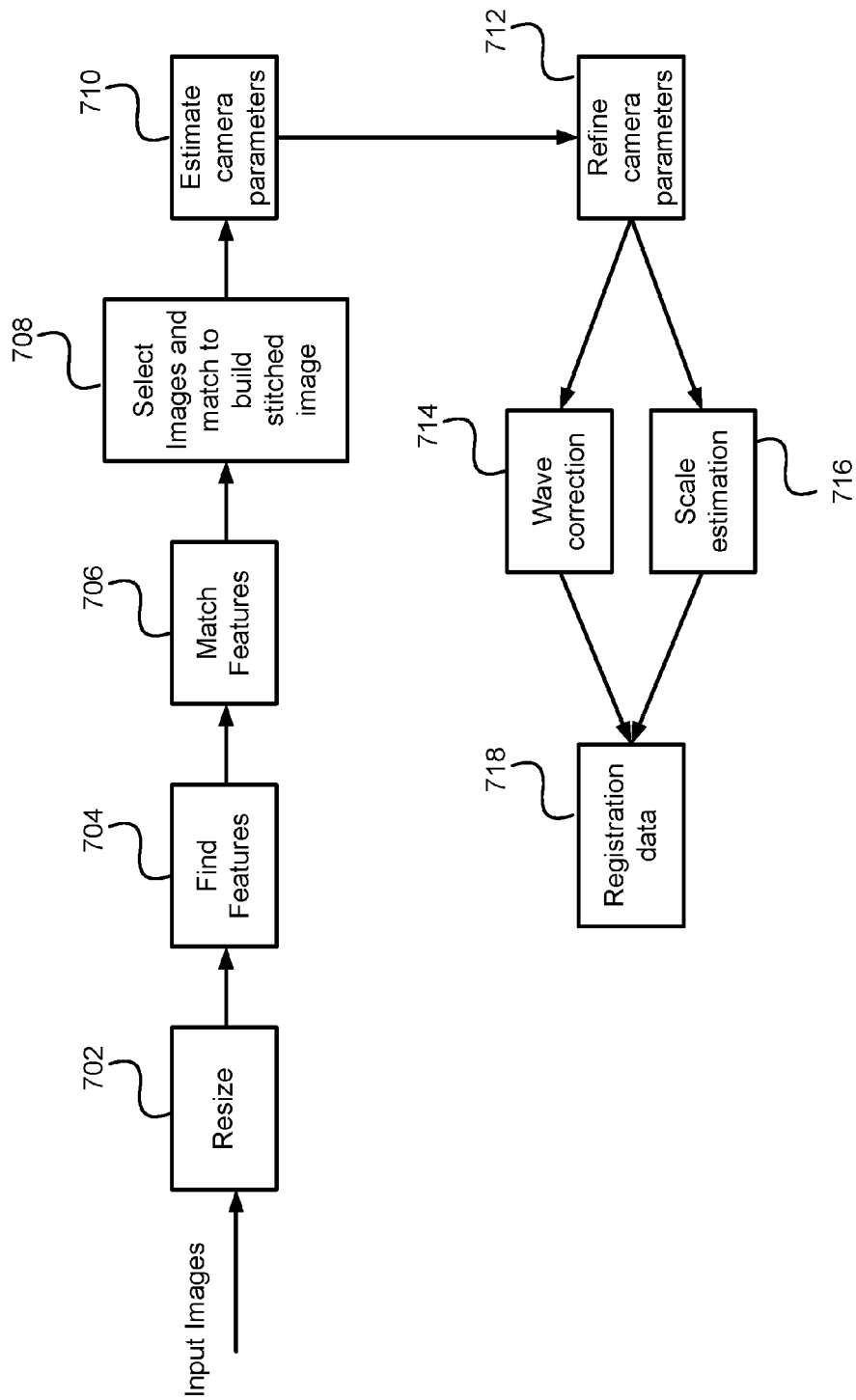
FIG. 7 is an example flow diagram illustrating registration of a plurality of input images.

FIG. 7 is an example flow diagram illustrating registration of the plurality of input images performed by the registration module 307. In one embodiment, registration of images can be performed using known public or proprietary methods, for example OpenCV stitching. Some or all of the steps depicted in the example of FIG. 7 may be modified or removed and additional steps may be added to fit particular image stitching needs. At 702, the registration module 307 resizes each input image to a suitable size for future processing. For example, the registration module 307 may reduce the image size to reduce processing time. However, reducing the image size may result in reduced accuracy of image detection. Therefore, in some embodiments, the process of image registration may be performed with little or no image resizing. At 704, the registration module 307 finds features in each of the input images. At 706, registration module 307 matches features from the input images. At 708, registration module 307 matches the input images to determine which images can be used to build the stitched image. In one embodiment, the registration module 307 can exclude input images that are not necessary to create a complete stitched image (e.g., duplicate images, images completely covered by a combination of other images, images having no overlap with the remaining input images, etc.). At 710, the registration module 307 estimates camera parameters, and at 712, refines the camera parameters. The registration module 307 uses the camera parameters, at 714, to perform wave correction and, at 716, perform scale estimation on the input images. At 718, the registration module 307 outputs the registration data.

Figure 8:
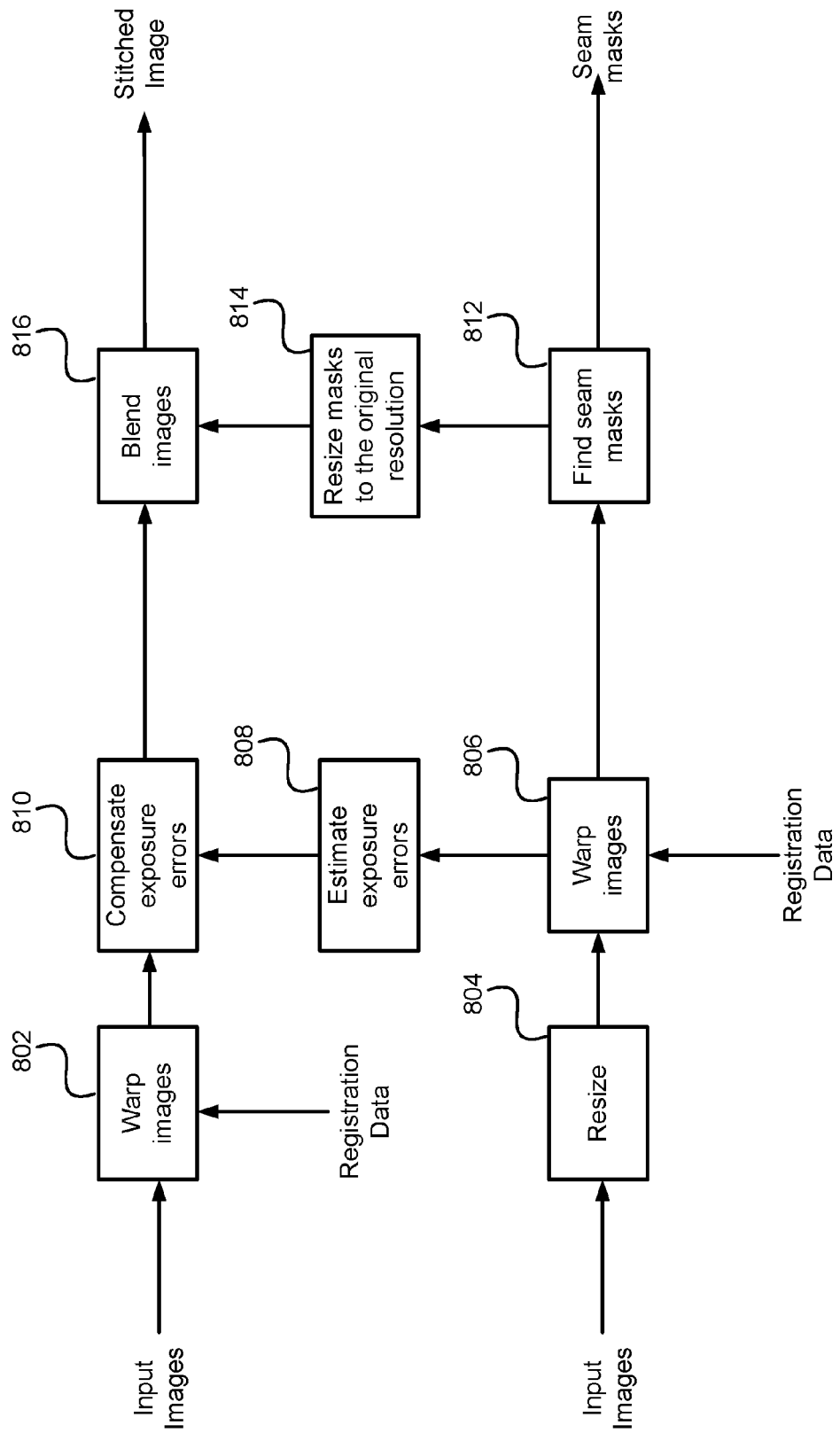
FIG. 8 is an example flow diagram depicting image compositing.

FIG. 8 is an example flow diagram depicting image compositing performed by the compositing module 309. In one embodiment, image compositing can be performed using known public or proprietary methods, for example, the OpenCV stitching. At 802, the compositing module 309 receives the input images and registration data, and uses the registration data from the registration module 307 to warp the input images. In one embodiment, to reduce processing time, the compositing module 309 resizes the input images, at 804, to a low resolution and, at 806, warps the resized images using registration data from the registration module 307. However, reducing the image size may result in reduced accuracy of image detection. Therefore, in other embodiments, the process of image compositing may continue with little or no image resizing. At 808 the compositing module 309 estimates exposure errors using the resized warped images. At 810 the compositing module uses the estimated exposure errors to compensate for exposure errors in the warped images. Using the resized warped images, the compositing module 309 finds seam masks at 812 and, at 814, resizes the masks to the original resolution (e.g., if the image has been previously reduced in size at 804). At 816 the compositing module 309 blends the warped input images using the resized seam masks to output the final stitched image.

Figure 9:
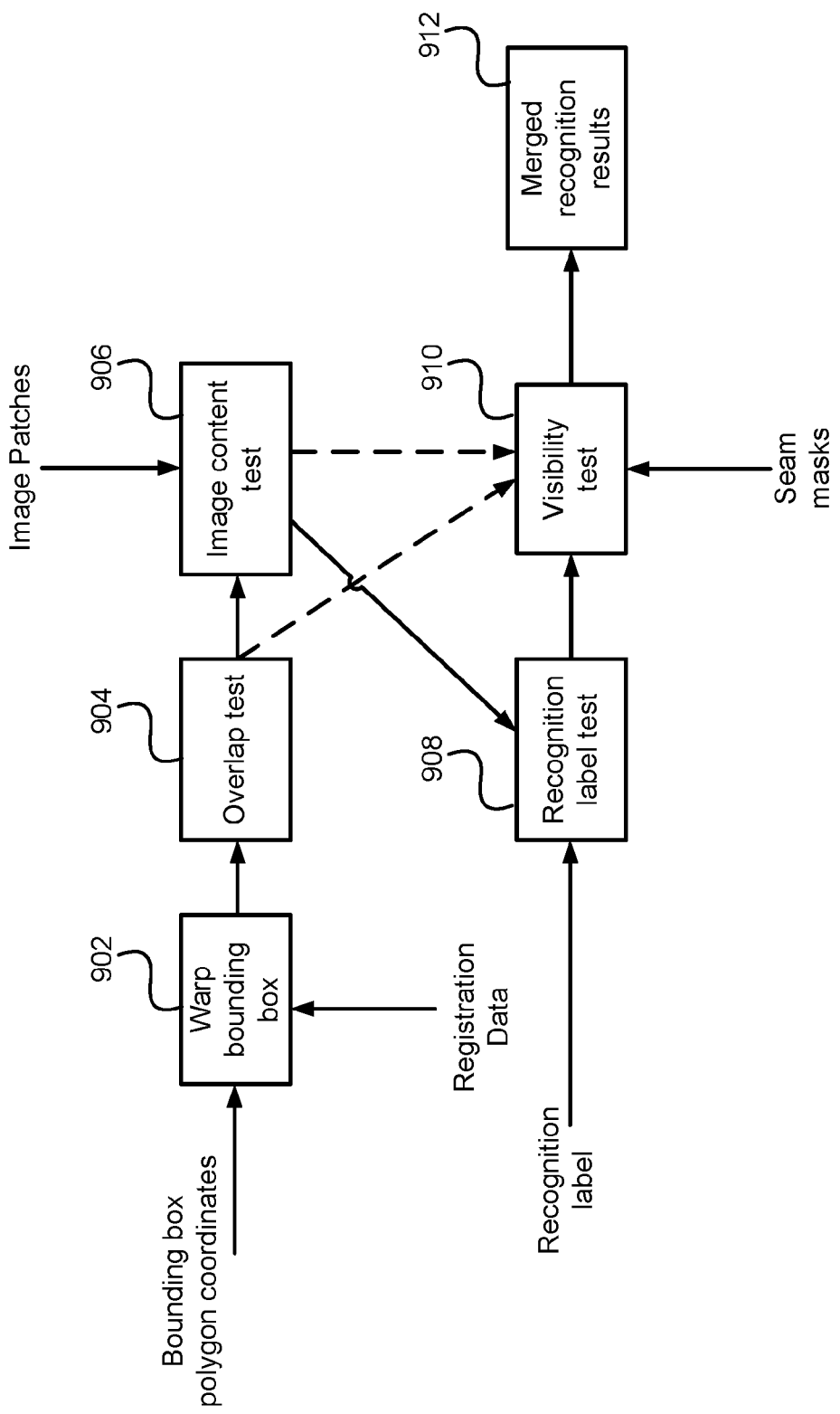
FIG. 9 is an example flow diagram illustrating a process for merging recognition results for a plurality of images using information obtained while stitching the plurality of images.

FIG. 9 is an example flow diagram illustrating a process for merging recognition results for a plurality of images using information obtained while stitching the plurality of images performed by the merge module 311. The example of FIG. 9 illustrates a single iteration of a process for comparing pairs of image recognition results from the plurality of images. The merge module 311 may perform the process described in FIG. 9 for each pair of image recognition results to determine if the pair of image recognition results represents the same real-world object, in which case, the image recognition results may be combined. At 902, the merge module 311 uses bounding box polygon coordinates from the recognition module 301 and registration data from the registration module 307 to warp the bounding boxes for the pair of image recognition results. At 904, the merge module 311 uses the warped bounding boxes to perform an overlap test to determine whether the two recognized objects are distinct real-world objects or the same real-world object. The overlap test is described in more detail below with reference to FIG. 10A. If the overlap test shows that the two recognized objects are distinct real-world objects, the merge module 311 stops the process of FIG. 9 and moves to the next pair of image recognition results. Otherwise, the process continues at 906, or optionally at 910 (as shown by the dashed line) if the overlap test result is above a threshold.

At 906, if the overlap test shows that the two recognized objects may be the same real-world object, the merge module 311 performs an image content test. The merge module 311 uses image patches from the input images to perform an image content test as described in more detail below with reference to FIG. 10B. If the image content test shows that the two recognized objects are distinct real-world objects, the merge module 311 stops the process of FIG. 9 and moves to the next image recognition pair. Otherwise, the process continues at 908, or optionally at 910 (as shown by the dashed line) if the image contents test result is above a threshold. At 908, if the overlap test, at 904, and the image content test, at 906, show that the two recognized objects may be the same real-world object, the merge module 311 performs a recognition label test. The recognition label test is described in more detail below with reference to FIG. 10C. If the recognition label test shows that the two recognized objects are distinct real-world objects, the merge module 311 stops the process of FIG. 9 and moves to the next image recognition pair. Otherwise, at 910, the merge module 311 performs a visibility test. The visibility test is described in more detail below with reference to FIG. 10D. The merge module 311 uses seam masks from the compositing module 309 to perform the visibility test as described below. At 912 merge module 311 generates and outputs the merged recognition results.

Figure 10A:
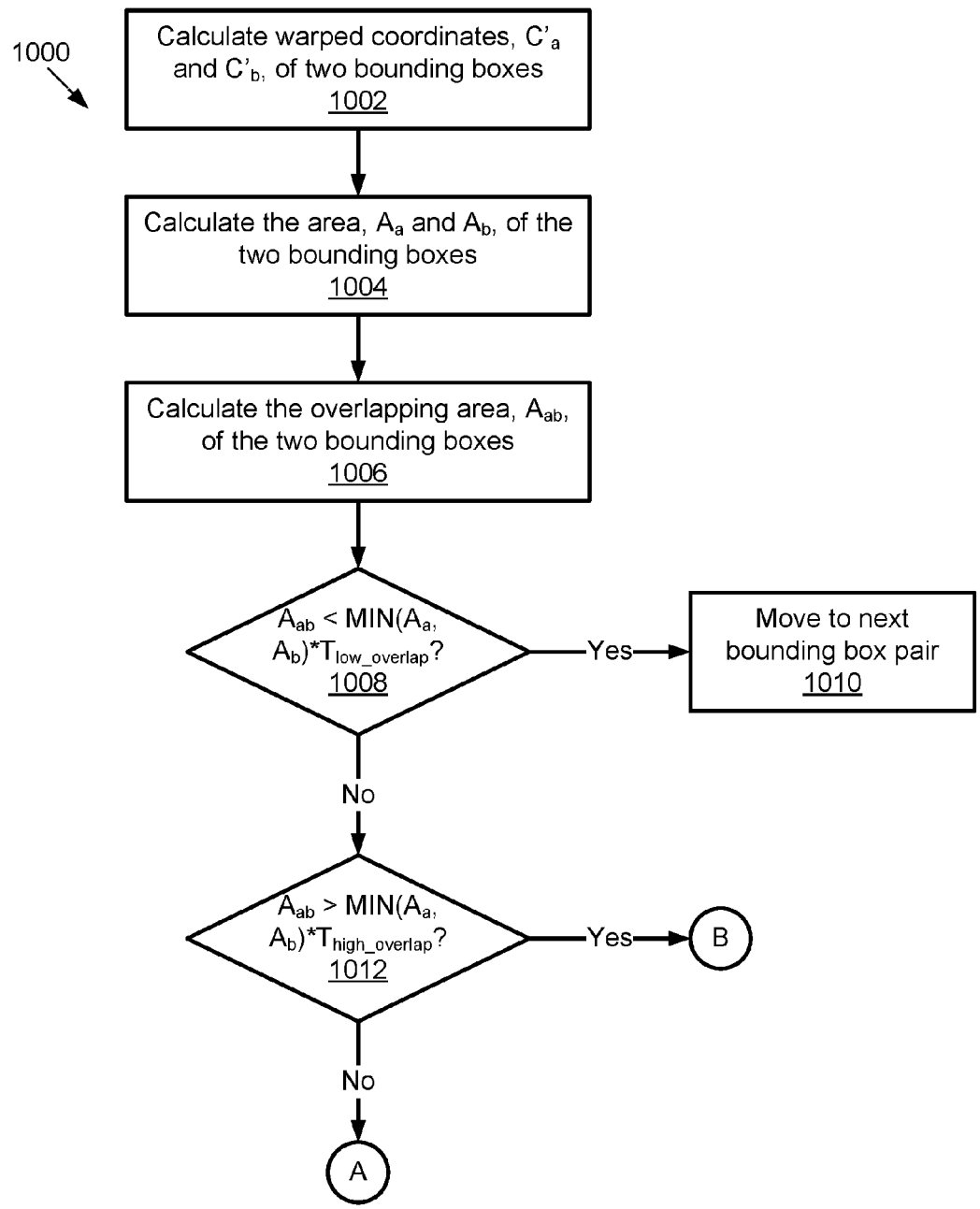
FIGS. 10A-10D depict an example flow diagram illustrating a process for merging recognition results for a plurality of images using information obtained while stitching the plurality of images.

FIG. 10A is an example flow diagram illustrating a process 1000 for merging recognition results for a plurality of images using information obtained while stitching the plurality of images. In particular, FIG. 10A illustrates an overlap test. As described above, each recognition result may include a list of descriptions of the recognized objects from an input image. At 1002, the merge module 311 calculates warped coordinates $C'_a$ and $C'_b$ of two bounding boxes. For example, as described above at 902, the merge module may receive bounding boxes for each recognized object from the recognition module 301 and warp the bounding box coordinates using registration data, including a detected camera viewpoint matrix, received from the registration module 307. In one embodiment, the merge module 311 only warps the vertexes of the bounding box so that the warped bounding box is still a polygon. In another embodiment, the merge module 311 may warp all lines of the bounding box. The overlap test operates under that assumption that if a single object is recognized in more than one different input image, then the bounding boxes of each recognition will have some overlap in the final stitched image. If the two warped bounding boxes overlap the more than a threshold amount, the merge module overlap test ensures that the same object is not counted twice. The merge module 311 calculates an area, $A_a$ and $A_b$, of the two bounding boxes, at 1004, and the overlapping area, $A_{ab}$, of the two bounding boxes, at 1006. Given only the warped polygon coordinates of the two bounding boxes, the overlapping area of two polygons may be calculated.

FIGS. 11A-11C illustrate block diagrams depicting bounding boxes of recognized objects in input images. The example of FIG. 11A depicts a recognized object 1110 from a first input image having a bounding box 1112 determined by the recognition module 311. Similarly, FIG. 11B depicts a recognized object 1110 from a second input image having a bounding box 1114 determined by the recognition module 311. FIG. 11C illustrates the recognized object 1110 and the two bounding boxes 1112 and 1114 after the first and second image have been stitched. As can be seen from the example of FIGS. 11A-C, the two bounding boxes may have an overlap area that may be used by the merge module 311 to determine if the recognized object 1110 from the first and second image is the same real-world object.

At 1008, the merge module 311 compares the overlapping area $A_{ab}$ to a minimum overlapping threshold (e.g., MIN $(A_a, A_b)*T_{lowoverlap}$). If the overlapping percentage is smaller than the minimum overlapping threshold (e.g., 30%), the two objects are considered to be different objects. At 1010, the merge module 311 moves to the next bounding box pair. If the overlapping percentage is greater than the minimum overlapping threshold, at 1008, the merge module 311 compares the overlapping area $A_{ab}$ to a maximum overlapping threshold, (e.g., MIN $(A_a, A_b)*T_{high\_overlap}$) at 1012. If the overlapping percentage is greater than the maximum overlapping threshold (e.g., 70%), the two objects are considered to be a repeated count of the same object and the merge module 311 continues to the visibility test (reference B). If the overlapping percentage is less than the maximum overlapping threshold, the merge module 311 continues to an image content test (reference A).

Figure 10B:
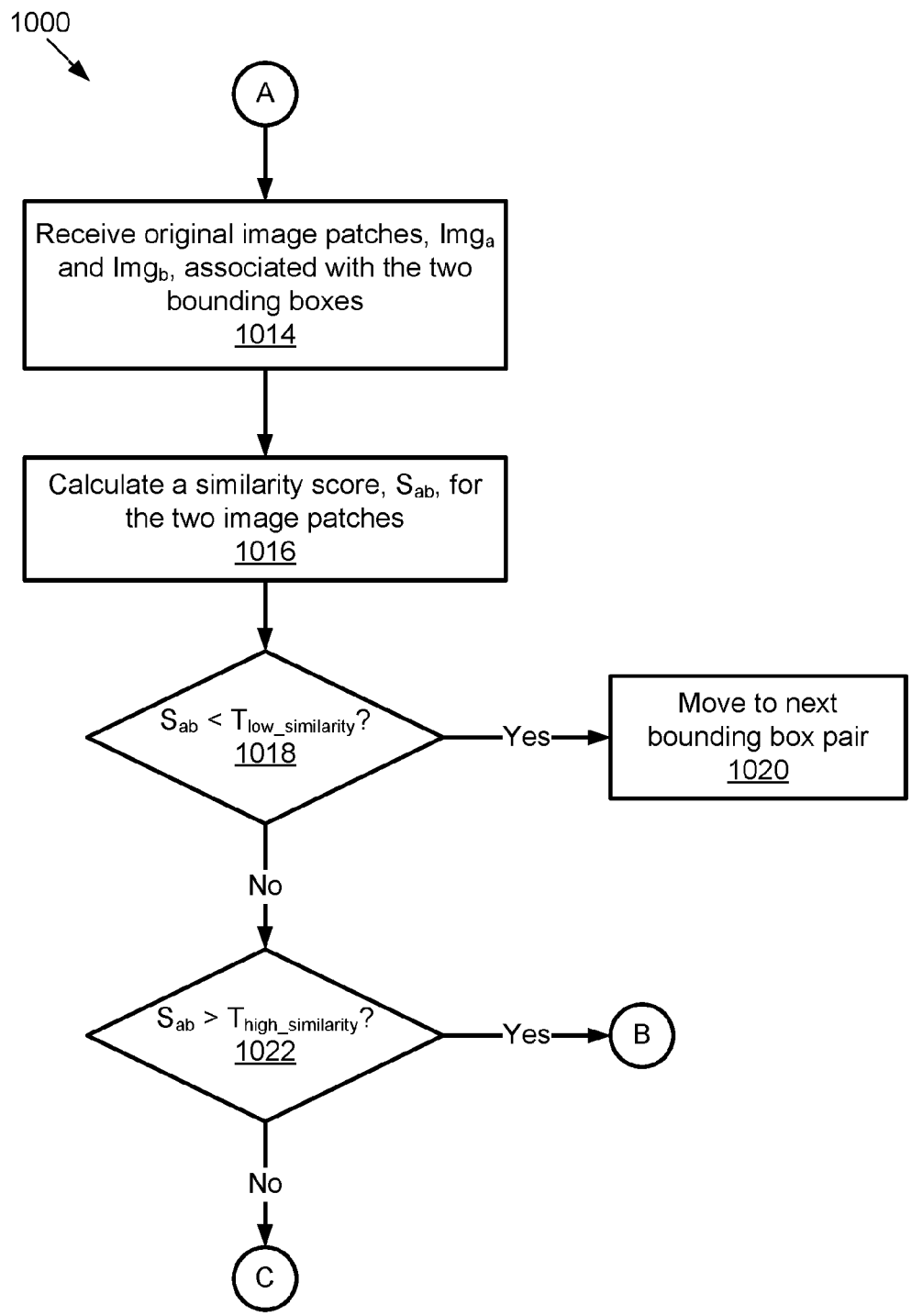

FIG. 10B is a continuation of the example flow diagram illustrating the process 1000 for merging recognition results for a plurality of images using information obtained while stitching the plurality of images. Particularly, FIG. 10B illustrates an example of an image content test performed by the merge module 311. The motivation for the image content test is that due to inaccurate skew introduced in image stitching a bounding box in the original image may be off target after warping, for example, as depicted by bounding box 1114 in the example of FIG. 11C. In this case, the merge module 311 can compare the similarity of image patches corresponding to the bounding boxes that are extracted from original input images. At 1014, image patches from the original input images, $Img_a$ and $Img_b$, associated with the two bounding boxes are received from the recognition module 301. At 1016, the merge module 311 calculates a similarity score, $S_{ab}$, for the two image patches. The similarity score $S_{ab}$ may then be compared, at 1018, to a minimum similarity threshold (i.e., $T_{low\_similarity}$). If the similarity score is below the minimum similarity threshold, the merge module 311 determines that the two recognized objects are not the same real-world object and, at 1020, moves to the next bounding box pair. If, at 1018, the similarity score is above the minimum similarity threshold, the merge module 311, at 1022, compares the similarity score to a maximum overlapping threshold (i.e., $T_{high\_similarity}$). If the similarity score is greater than the maximum similarity threshold, the merge module 311 continues to the visibility test (reference B). If the similarity score is less than the maximum similarity threshold, the merge module continues to a recognition label test described below (reference C).

Figure 10C:
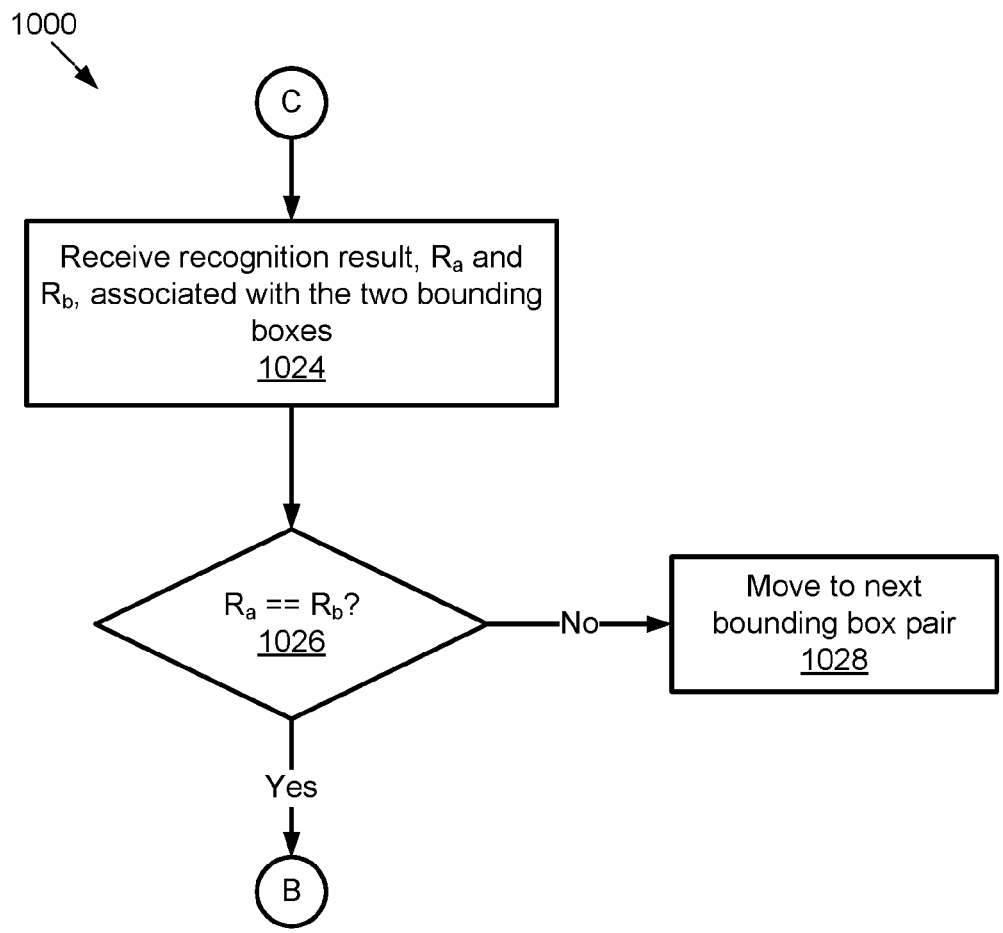

FIG. 10C is a continuation of the example flow diagram illustrating the process 1000 for merging recognition results for a plurality of images using information obtained while stitching the plurality of images. Particularly, FIG. 10C illustrates an example of a recognized object test performed by the merge module 311. Since, as described above, the recognized objects are labeled with an object ID and other characteristics in the recognition results, the merge module 311 may use the recognition data in determining whether the two bounding boxes correspond to a single or different real-world objects. At 1024, the merge module 311 receives, from the recognition module 301, the recognition results, $R_a$ and $R_b$, associated with the two bounding boxes. In another embodiment, the merge module 311 may use other metadata from the recognition results to determine an object match. For example, the recognition results may include the size of a bounding box for the recognized object (e.g., in pixels) and the merge module 311 may compare the sizes of the bounding boxes. Additionally, the merge module 311 may compare the sizes of the bounding boxes to the size of an object in the recognition database and give priority to the bounding box most closely matching the size of the object in the database. The merger module then compares, at 1026, recognition result $R_a$ and the recognition result $R_b$. If the recognition result $R_a$ and the recognition result $R_b$ are not equal (e.g., the object IDs associated with the two recognition results are not the same) the merge module 311 determines that the two recognized objects are not the same real-world object and, at 1028, moves to the next bounding box pair. If the recognition results are equal, the merge module 311 continues to the visibility test (reference B) described below.

Figure 10D:
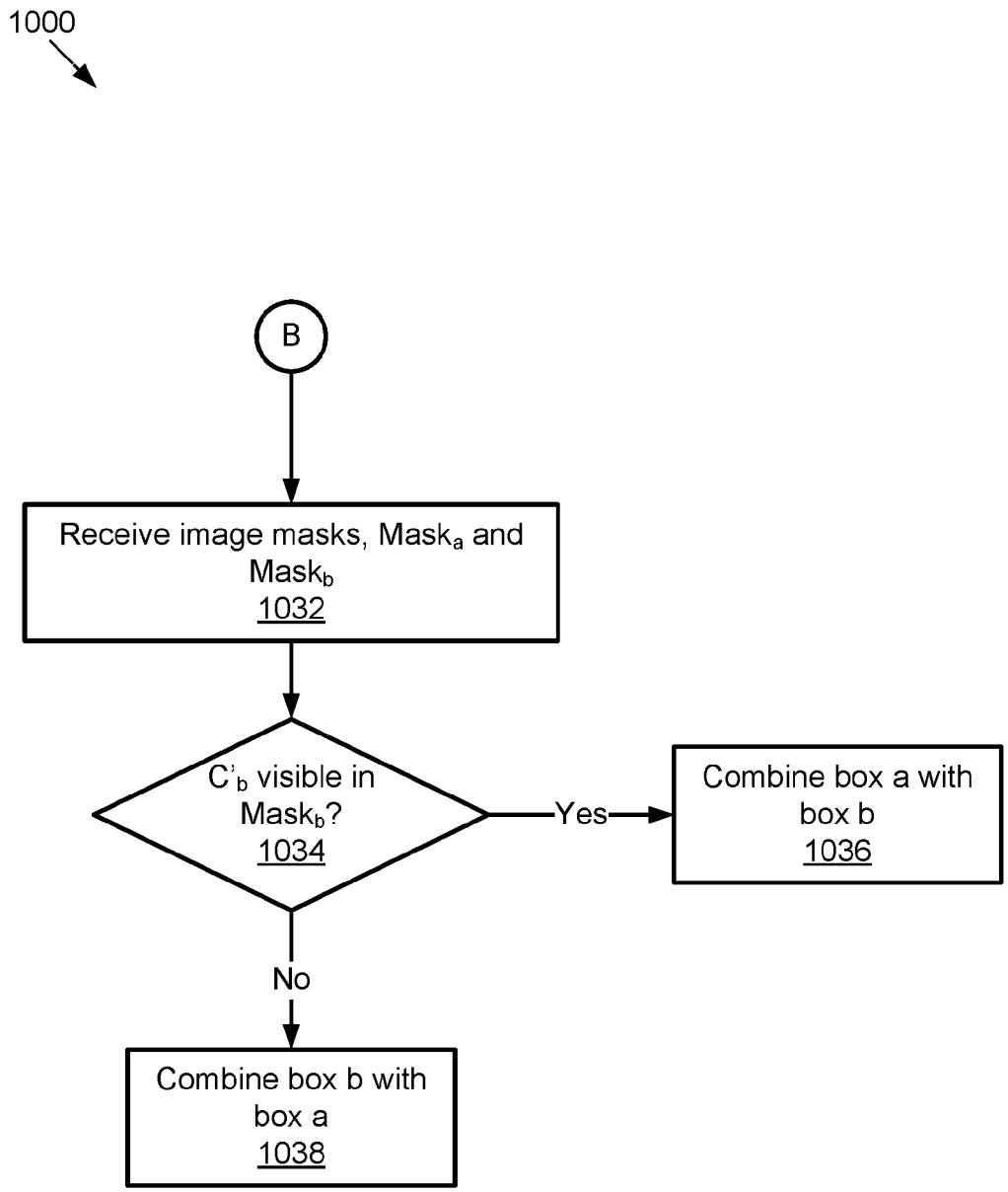

FIG. 10D is a continuation of the example flow diagram illustrating the process 1000 for merging recognition results for a plurality of images using information obtained while stitching the plurality of images. Particularly, FIG. 10D illustrates an example of a visibility test performed by the merge module 311. If the merge module 311 determines that the two boxes are likely to be repeated recognitions of the same real-world object (e.g., by performing the overlapping test, the image content test, and/or the recognized object test described above), the merge module 311 may combine the results or remove one of the recognition results using the visibility test to determine which bounding box should be given a higher priority. For example, if the merge module 311 determines that the two bounding boxes are likely referring to the same real-world object, the merge module 311 may give the bounding box which covers the entire object, or the greater portion of the object, higher priority. The merge module 311 may use a seam mask generated in the image stitching algorithm, and provided by the compositing module 309, to determine which bounding box to give a higher priority.

Figure 12:
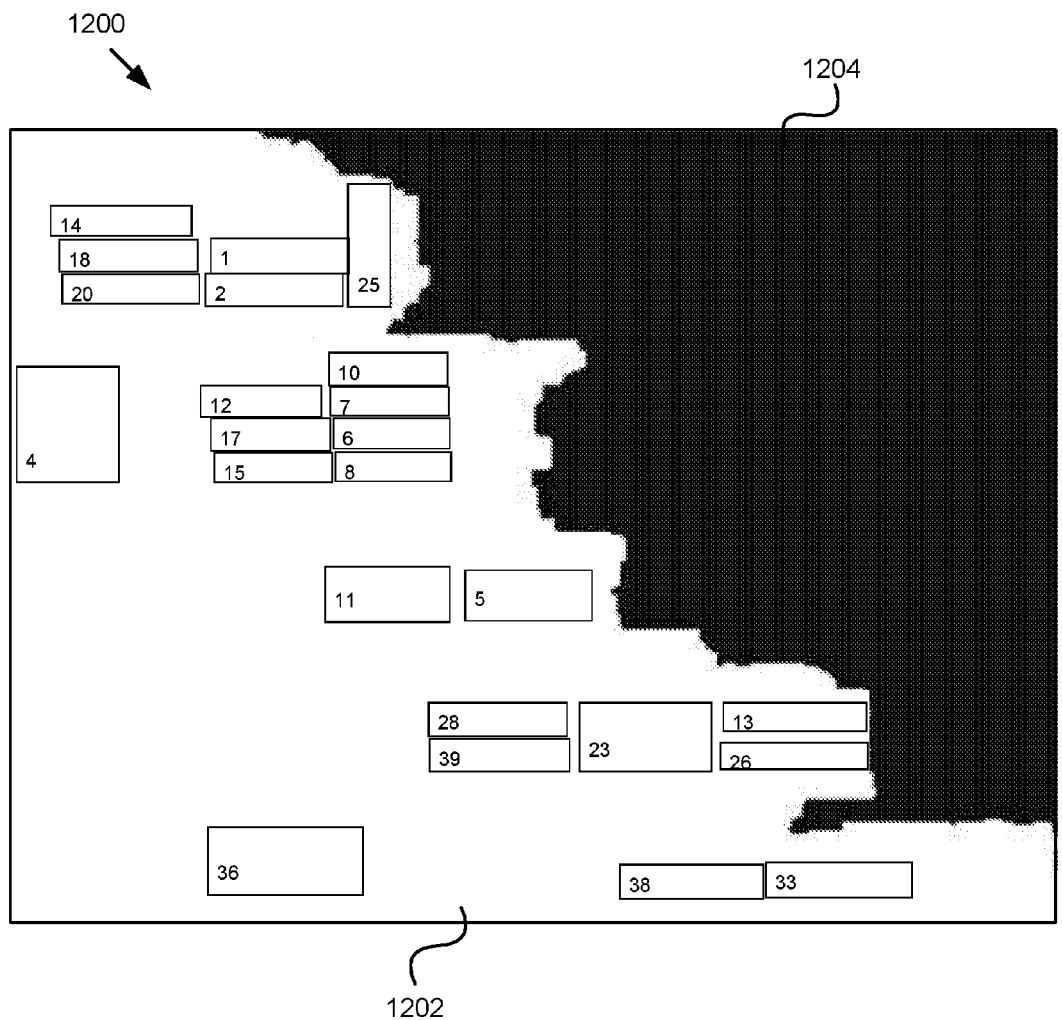
FIG. 12 illustrates bounding boxes in a mask image.

FIG. 12 illustrates bounding boxes in a seam mask image 1200. The white portion 1202 of the seam mask image indicates an area that will be included as part of the final stitched image and the dark portion 1204 indicates an area that will not be included in the final stitched image.

Returning now to FIG. 10D, at 1032, the merge module 311 receives at least one image mask, e.g., one or more of the image masks $Mask_a$ and $Mask_b$, from the compositing module 309. At 1034, the merge module 311 determines whether the warped bounding box $C'_b$ (previously calculated by the merge module 311, for example, at 1002) falls within the visible portion of the seam mask image $Mask_b$. If the merge module 311 determines that the warped bounding box does fall within the visible portion of the seam mask image, the merge module 311 combines 1036 the recognition result for bounding box a with bounding box b, with bounding box b having the higher priority. If the merge module 311 determines that the warped bounding box does not fall within the visible portion of the seam mask image, the merge module 311 combines 1038 the recognition result for bounding box b with bounding box a, with bounding box a having the higher priority. In one embodiment, combining the recognition results includes combining metadata corresponding to the recognition results received from the recognition module 301. For example, in one embodiment, the recognition module 301 may provide a measure the number of points from the input image that match a recognized object. This measure may be combined in the merged result. In another embodiment, instead of combining the two results, the merge module 311 may remove the recognition result having the lower priority. In yet another embodiment, the merge module 311 may include the removed recognition result as an alternative recognition in the merged recognition result.

A system and method for merging recognition results for a plurality of images has been described. In the above description, for purposes of explanation, numerous specific details are set forth in order to provide a thorough understanding of the techniques introduced herein. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the techniques may be implemented using any type of computing system that can receive data and commands, and present information as part of any peripheral device providing services.

Reference in the specification to "one embodiment" or "an embodiment" means that a particular feature, structure, or characteristic described in connection with the embodiment is included in at least one embodiment of the description. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In one embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments has been presented for the purposes of illustration and description. It is not intended to be exhaustive or to limit the techniques to the precise form disclosed. Many modifications and variations are possible in light of the above teaching. It is intended that the scope of the embodiments be limited not by this detailed description, but rather by the claims of this application. As will be understood by those familiar with the art, the examples described herein may be embodied in other specific forms without departing from the spirit or essential characteristics thereof. Likewise, the particular naming and division of the modules, routines, features, attributes, methodologies and other aspects are not mandatory or significant, and the mechanisms that implement the techniques or features may have different names, divisions and/or formats. Furthermore, as will be apparent to one of ordinary skill in the relevant art, the modules, routines, features, attributes, methodologies and other aspects of the techniques can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, known to those of ordinary skill in the art of computer programming. Additionally, the techniques are in no way limited to implementation in any specific programming language, or for any specific operating system or environment. Accordingly, the specification is intended to be illustrative, but not limiting, of the scope of the claims, which are set forth below.

What is claimed is:

1. A method comprising:
producing a plurality of recognition results for a plurality of input images, the recognition results including a first recognition result and a second recognition result from the plurality of input images;

identifying a first bounding box associated with the first recognition result and a second bounding box associated with the second recognition result;
generating a first warped bounding box associated with the first recognition result using the first bounding box and registration data associated with the plurality of input images and a second warped bounding box associated with the second recognition result using the second bounding box and the registration data associated with the plurality of input images;
comparing the first warped bounding box and the second warped bounding box to determine whether the first recognition result and the second recognition result represent a same real-world object in the plurality of input images;
in response to determining that the first recognition result and the second recognition result represent the same real-world object in the plurality of input images, merging the plurality of recognition results by combining the first recognition result with the second recognition result, to generate a merged recognition result; and
outputting the merged recognition result.

2. The method of claim 1, wherein merging the plurality of recognition results comprises:
identifying a first area for the first warped bounding box corresponding to the first recognition result;
identifying a second area for the second warped bounding box corresponding to the second recognition result;
determining an overlap area between the first area and the second area; and
comparing the overlap area with an overlap threshold.

3. The method of claim 1, wherein merging the plurality of recognition results comprises comparing a first label of the first bounding box corresponding to the first recognition result with a second label of the second bounding box corresponding to the second recognition result, wherein the first label and the second label respectively identify objects recognized by the first bounding box and the second bounding box in the first recognition result and the second recognition result.

4. The method of claim 1, wherein merging the plurality of recognition results comprises:
identifying a first image patch for the first bounding box corresponding to the first recognition result;
identifying a second image patch for the second bounding box corresponding to the second recognition result;
determining an image similarity score between the first image patch and the second image patch; and
comparing the image similarity score with an image similarity threshold.

5. The method of claim 1, wherein merging the plurality of recognition results comprises comparing the first bounding box corresponding to the first recognition result and the second bounding box corresponding to the second recognition result, to a seam mask image to determine whether the first bounding box or the second bounding box falls within a visible portion of the seam mask image.

6. The method of claim 1, wherein producing the plurality of recognition results comprises comparing a bounding box size to an object size stored in a recognition database.

7. The method of claim 1, wherein merging the plurality of recognition results comprises:
removing a recognition result having a lower priority; and
providing the recognition result having the lower priority as an alternative recognition result.

8. A system comprising:
a processor;
a memory coupled with the processor;
a recognition module stored on the memory and executable by the processor, the recognition module configured to produce a plurality of recognition results for a plurality of input images, the recognition results including a first recognition result and a second recognition result from the plurality of input images, and identify a first bounding box associated with the first recognition result and a second bounding box associated with the second recognition result; and
a merge module stored on the memory and executable by the processor, the merge module configured to generate a first warped bounding box associated with the first recognition result using the first bounding box and registration data associated with the plurality of input images and a second warped bounding box associated with the second recognition result using the second bounding box and the registration data associated with the plurality of input images, compare the first warped bounding box and the second warped bounding box to determine whether the first recognition result and the second recognition result represent a same real-world object in the plurality of input images and in response to determining that the first recognition result and the second recognition result represent the same real-world object in the plurality of input images, merge the plurality of recognition results by combining the first recognition result with the second recognition result, to generate a merged recognition result.

9. The system of claim 8, wherein the merge module is configured to:
identify a first area for the first warped bounding box corresponding to the first recognition result;
identify a second area for the second warped bounding box corresponding to the second recognition result;
determine an overlap area between the first area and the second area; and
compare the overlap area with an overlap threshold.

10. The system of claim 8, wherein the merge module is configured to compare a first label of the first bounding box corresponding to the first recognition result with a second label of the second bounding box corresponding to the second recognition result, wherein the first label and the second label respectively identify objects recognized by the first bounding box and the second bounding box in the first recognition result and the second recognition result.

11. The system of claim 8, wherein the merge module is configured to:
identify a first image patch for the first bounding box corresponding to the first recognition result;
identify a second image patch for the second bounding box corresponding to the second recognition result;
determine an image similarity score between the first image patch and the second image patch; and
compare the image similarity score with an image similarity threshold.

12. The system of claim 8, wherein the merge module is configured to compare the first bounding box corresponding to the first recognition result and the second bounding box corresponding to the second recognition result, to a seam mask image to determine whether the first bounding box or the second bounding box falls within a visible portion of the seam mask image.

13. The system of claim 8, wherein the recognition module is configured to compare a bounding box size to an object size stored in a recognition database.

14. The system of claim 8, wherein the merge module is configured to:
   remove a recognition result having a lower priority; and
   provide the recognition result having the lower priority as an alternative recognition result.

15. A non-transitory computer-readable medium storing instructions which, when executed by one or more processors, cause the one or more processors to:
   produce a plurality of recognition results for a plurality of input images, the recognition results including a first recognition result and a second recognition result from the plurality of input images;
   identify a first bounding box associated with the first recognition result and a second bounding box associated with the second recognition result;
   generate a first warped bounding box associated with the first recognition result using the first bounding box and registration data associated with the plurality of input images and a second warped bounding box associated with the second recognition result using the second bounding box and the registration data associated with the plurality of input images;
   compare the first warped bounding box and the second warped bounding box to determine whether the first recognition result and the second recognition result represent a same real-world object in the plurality of input images;
   in response to determining that the first recognition result and the second recognition result represent the same real-world object in the plurality of input images, merge the plurality of recognition results by combining the first recognition result with the second recognition result, to generate a merged recognition result; and
   output the merged recognition result.

16. The non-transitory computer-readable medium of claim 15, wherein to merge the plurality of recognition results the instructions cause the one or more processors to:
   identify a first area for the first warped bounding box corresponding to the first recognition result;
   identify a second area for the second warped bounding box corresponding to the second recognition result;
   determine an overlap area between the first area and the second area; and
   compare the overlap area with an overlap threshold.

17. The non-transitory computer-readable medium of claim 15, wherein to merge the plurality of recognition results the instructions cause the one or more processors to compare a first label of the first bounding box corresponding to the first recognition result with a second label of the second bounding box corresponding to the second recognition result, wherein the first label and the second label respectively identify objects recognized by the first bounding box and the second bounding box in the first recognition result and the second recognition result.

18. The non-transitory computer-readable medium of claim 15, wherein to merge the plurality of recognition results the instructions cause the one or more processors to:
   identify a first image patch for the first bounding box corresponding to the first recognition result;
   identify a second image patch for the second bounding box corresponding to the second recognition result;
   determine an image similarity score between the first image patch and the second image patch; and
   compare the image similarity score with an image similarity threshold.

19. The non-transitory computer-readable medium of claim 15, wherein to merge the plurality of recognition results the instructions cause the one or more processors to compare the first bounding box corresponding to the first recognition result and the second bounding box corresponding to the second recognition result, to a seam mask image to determine whether the first bounding box or the second bounding box falls within a visible portion of the seam mask image.

20. The non-transitory computer-readable medium of claim 15, wherein to produce the plurality of recognition results the instructions cause the one or more processors to compare a bounding box size to an object size stored in a recognition database.

* * * * *